United States Patent

[11] 3,607,880

| [72] | Inventor | Kazuo Tomita<br>Tokyo, Japan |
|---|---|---|
| [21] | Appl. No. | 9,094 |
| [22] | Filed | Feb. 9, 1970 |
| [45] | Patented | Sept. 21, 1971 |
| [73] | Assignee | Sankyo Company Limited<br>Tokyo, Japan |

[54] PREPARATION OF 3-HYDROXYISOXAZOLE COMPOUNDS
4 Claims, No Drawings

| [52] | U.S. Cl. | 260/307 H, 260/307 A, 424/272 |
|---|---|---|
| [51] | Int. Cl. | C07d 85/22 |
| [50] | Field of Search | 260/307.1, 307.8 |

[56] References Cited
FOREIGN PATENTS
1,446,728  6/1966  France .........................

*Primary Examiner*—Alex Mazel
*Assistant Examiner*—R. V. Rush
*Attorney*—McGlew and Toren ABSTRACT: In a process for preparing a 3-hydroxyisoxazole of the formula

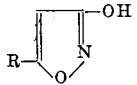

wherein R is hydrogen or alkyl of 1 to 5 carbon atoms and wherein a compound of the formula

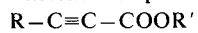

R—C≡C—COOR' wherein R is as defined and R' is alkyl of 1 to 5 carbon atoms is reacted with hydroxylamine, the invention proposes that the reaction is conducted in the presence of an alkaline earth metal hydroxide in an amount of 0.5 to 1.5 moles per mole of free hydroxylamine base.

PREPARATION OF 3-HYDROXYISOXAZOLE COMPOUNDS

This application is a continuation of Ser. No. 813,291, filed Apr. 3, 1969 and now abandoned.

This invention relates to an improvement in the preparation of 3-hydroxyisoxazole compounds.

More particularly, it relates to an improved process for the preparation of a 3-hydroxyisoxazole compound having the formula

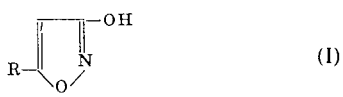

where R is hydrogen atom or an alkyl group of 1 to 5 carbon atoms, e.g. methyl, ethyl, n-propyl, i-propyl, tert.-butyl or n-pentyl.

The 3-hydroxyisoxazole compound of the above formula (I) has been prepared, as disclosed in French Patent No. 1,446,728 granted to I. Iwai et al. on June 13, 1966, by reacting a propiolic acid derivative having the formula R–C ≡C–COOR′ (II) wherein R is defined above and R′ is an alkyl group of 1 to 5 carbon atoms with hydroxylamine in the presence of an alkali metal hydroxide.

However, such prior process has some disadvantages to be improved from a commercial point of view:

That is, a favorable yield of the desired 3-hydroxyisoxazole compound having a high purity is not achieved because of formation of byproducts, 5-isoxazolone, a further purification step is necessarily required for obtaining the pure product and so on.

Now, as a result of our extensive investigations on an improvement in the preparation of 3-hydroxyisoxazole compounds, it has been unexpectedly found that use of an alkaline earth metal hydroxide instead of the alkali metal hydroxide in the process according to the above French Patent can provide a remarkably high yield of the 3-hydroxyisoxazole compound having an exceptionally high purity, without any further purification procedure and production of an appreciable amount of the 5-isoxazole byproducts, as compared with the process disclosed in the above-mentioned French patent. Furthermore, the alkaline earth metal hydroxide to be employed in the process of this invention is less expensive than the hydroxide employed in the process of the above French Patent. More specifically, according to the process of this invention, a high yield of more than about 90% of the 3-hydroxyisoxazole compound (I) can be obtained of a high purity of more than about 95% without any further purification procedure, whereas, according to the prior process as set forth hereinabove, a yield of about 85% of the desired product with a purity of about 70% can be obtained unless further purified and even if one contemplates to obtain the same level of a purity as that in the present process by means of a further purification procedure, a yield of about 60% at the best can be given.

It is, accordingly, an object of this invention to provide an improved and commercially advantageous process for the preparation of the 3-hydroxyisoxazole compound of the formula (I).

Other objects of this invention will be apparent from the following description of this invention.

According to this invention, in the process for the preparation of the 3-hydroxyisoxazole compound having the above formula (I) wherein the starting propiolic acid derivative having the above formula (II) is reacted with hydroxylamine, the improvement which comprises conducting said reaction in the presence of an alkaline earth metal hydroxide, said alkaline earth metal hydroxide being used in an amount sufficient to maintain the reaction medium at an alkaline pH.

In carrying out the improved process of this invention, the reaction may be preferably carried out in a reaction solvent. As a reaction solvent, there may be employed water or any of organic solvents that will not adversely affect the reaction of the present process. Suitable examples of reaction solvents which may be employed include water; alcohols, e.g. methanol, ethanol; cyclic ethers, e.g. dioxane tetrahydrofuran, aromatic hydrocarbons, e.g. benzene; aqueous alcohols, e.g. aqueous methanol, aqueous ethanol; and aqueous cyclic ethers, e.g. aqueous dioxane and aqueous tetrahydrofuran.

Although the reactant, hydroxylamine, may be incorporated in the form of a free base, it is usual and preferable to employ an inorganic or organic acid addition salt thereof, for example, hydrochloride, sulfate and the like. Where one employs as a reactant one of acid addition salts, such as sulfate, of hydroxylamine that are very slightly soluble in a reaction solvent other than water, it is preferable to conduct the reaction using as a reaction solvent water or an aqueous organic solvent, e.g. aqueous methanol, aqueous dioxane and the like.

Suitable examples of alkaline earth metal hydroxides which may be employed include calcium hydroxide and barium hydroxide. Generally, calcium hydroxide is most preferable for the purpose of this invention because of availability with a low price.

In the process of this invention, the starting propiolic acid derivative (II) and hydroxylamine (as a free base) may suitably be employed in a molar ratio of about 1:1 to about 1: slightly over 1. It is essential in the process of this invention to employ the alkaline earth metal hydroxide in an amount sufficient to maintain the reaction medium at an alkaline pH. Thus, where free hydroxylamine base is employed as a reactant, the alkaline earth metal hydroxide may be usually employed in an amount of at least about 0.5 mole, and preferably about 1.0 to 1.5 moles, per mole of free hydroxylamine base and, where hydroxylamine is employed in the form of an acid addition salt, the alkaline earth metal hydroxide may be usually employed in an amount sufficient to convert said acid addition salt into the corresponding free base and simultaneously maintain the reaction medium at an alkaline pH, that amount being usually in the range of at least about 1.0 mole, and preferably about 1.5 to 2.0 moles, per mole of acid addition salt.

The reaction temperature is not critical feature in this process, but it is usual and preferable that the reaction is effected at ambient temperature, e.g. room temperature or higher and most advantageously at a reflux temperature of the reaction solvent employed. The reaction period may be varied mainly depending upon the amount of alkaline earth metal hydroxide and reaction temperature employed, but the reaction may be usually completed in about 2-6 hours at a reflux temperature of the reaction solvent employed.

After completion of the reaction, the desired product may be easily recovered from the reaction mixture by a conventional means. For instance, after completion of the reaction, the reaction product (I) can be recovered by a very simple procedure comprising acidification of the reaction mixture with a mineral acid, e.g. sulfuric acid, hydrochloric acid or nitric acid, removal of inorganic salts (if any) by filtration, concentration and then cooling.

The following Examples are given solely for the purpose of further illustration of this invention. They should not be construed to the limiting scope of this invention.

EXAMPLE 1

Preparation of 3-hydroxy-5-methylisoxazole

To a mixture of 14.8 g. of powdery calcium hydroxide in 50 ml. of water was added 30 g. of a 30% (w/w) aqueous solution of hydroxylamine sulfate while maintaining a sufficient stirring and at an inner temperature below 10° C. with ice cooling. The resulting mixture was stirred at that temperature and a solution of 9.8 g. of methyl tetrolate in 30 ml. of methanol was added. The temperature of the reaction mixture was allowed to gradually rise to room temperature. Then, the reaction mixture was refluxed for 5 hours.

After cooling, the reaction mixture was acidified to pH 2 by addition of 30% (v/v) nitric acid and then concentrated under reduced pressure to a volume of about 70 ml. The concentrate was cooled in an ice water bath, whereupon the desired product precipitated *in situ* as pale yellow needles. The substance thus precipitated was recovered by filtration, washed with a small quantity of cold water and then dried in a desiccator to give 8.9 g. of the desired product having a purity of 98.4% as crystals melting at 85–86° C. Yield: 88.5%. Coloring of the crystals thus obtained was not observed after standing for about 1 month.

The filtrate and washings were combined and concentrated to a volume of about 50 ml. After cooling, the crystalline substance which precipitated *in situ* was recovered by filtration and dried in a desiccator to give 0.5 g. of the desired product having a purity of 95.3% as pale yellow needles melting at 83–84° C. Yield: 4.9%.

Thus, upon combining two crops of crystals recovered as shown hereinabove, the desired product having a high purity of above 95% was obtained in a high yield of 93.4% without any purification procedure.

EXAMPLE 2

Preparation of 3-hydroxy-5-methylisoxazole

The reaction was carried out in the same manner as in the above Example 1 except that there were employed 8.3 g. of hydroxylamine hydrochloride, 11.9 g. of calcium hydroxide and 11.2 g. of ethyl tetrolate. After completion of the reaction, the reaction mixture was acidified to pH 2 by addition of 20% (v/v) sulfuric acid. The inorganic salts which precipitated *in situ* were recovered by filtration and washed with a small quantity of methanol. The combined filtrate and washings were concentrated under reduced pressure to a volume of about 20 ml. and cooled in an ice water bath to give the desired product as pale yellow needles, which were recovered by filtration, washed with cold water and then dried in a desiccator to give 8.7 g. of the desired product as pale yellow needles melting at 86° C. Yield 87.2%, Purity 99.2%.

And, into the combined filtrate and washings (22 ml.) was dissolved 5. g. of sodium chloride while hot and the resulting solution was cooled to give 0.7 g. of pale yellow needles melting at 83–84° C. Yield 6.7%, Purity 94.8%.

Thus, upon combining two crops of crystals recovered as shown hereinabove, the desired product having a high purity was obtained in a high yield of 93.9% without any purification procedure.

EXAMPLE 3

Preparation of 3-hydroxyisoxazole

The reaction was carried out in the same manner as in the above Example 1 except that there were employed 8.3 g. of hydroxylamine hydrochloride, 14.8 g. of calcium hydroxide and 9.8 g. of ethyl propiolate. After completion of the reaction, the reaction mixture was acidified to pH 2 by addition of concentrated hydrochloric acid and concentrated under reduced pressure to a volume of about 50 ml. and the concentrate was cooled in ice water bath to give faintly yellow scales, which were recovered by filtration, washed with cold water and dried to give 7.5 g. of the desired product as crystals melting at 97–98° C. Yield 87.2%, Purity 99.2%.

And, the combined filtrate and washings as above were concentrated to about 30 ml. and the crystalline substance which precipitated *in situ* was treated and dried in the same manner as above to give 0.9 g. of yellow scales melting at 94–95° C. Yield 10.0%, Purity 94.1%.

Thus, upon combining two crops of crystals recovered as shown hereinabove, the desired product having a high purity was obtained in a high yield of 97.2% without any purification procedure.

The crystals recovered as above were combined and then recrystallized from *n*-hexane to give 7.6 g. of colorless crystals melting at 98–99° C. Yield 89.4%, Purity 100.3%.

Then, some examples for the preparation of the 3-hydroxyisoxazole derivative of this invention according to the teachings of the above French Patent are given hereinbelow for the purpose of comparison.

PREPARATION 1

3-Hydroxy-5-methylisoxazole

To a solution of 5.6 g. of ethyl tetrolate in 100 ml. of ethanol was added a solution prepared by adding 13.9 g. of hydroxylamine hydrochloride to 180 ml. of a 10% aqueous sodium hydroxide solution. The resulting mixture was allowed to stand at room temperature overnight and then acidified by addition of conc. hydrochloric acid. The acidified mixture was extracted three times with ether. The combined extracts were washed with a saturated aqueous sodium chloride solution and dried over anhydrous sodium sulfate. After removal of the ether by distillation, there was obtained 4.0 g. of yellowish orange crystalline substance (purity 85.7%) melting at 80–82° C. Yield 69.2%.

The crude crystalline substance thus obtained was recrystallized from *n*-hexane to yield 3.2 g. of the desired product as colorless needles (purity 98.9%) melting at 84–86° C. Yield 64.6%. After standing at ambient temperature for a week, the purified crystals were colored yellowish orange.

PREPARATION 2

3-Hydroxyisoxazole

Following the same procedure as in the above Preparation 1 except that 4.9 g. of ethyl propiolate was employed instead of the ethyl tetrolate, there was obtained 2.5 g. of the desired product as crystalline substances (purity 98.5%) melting at 98–99° C. Yield 59%.

I claim:

1. In a process for preparing a compound having the formula

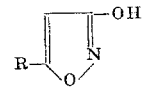

wherein R is hydrogen or alkyl of 1 to 5 carbon atoms wherein a compound having the formula R—C C—COOR' wherein R is as defined above and R' is alkyl of 1 to 5 carbon atoms is reacted with hydroxylamine, the improvement which comprises conducting said reaction in the presence of an alkaline earth metal hydroxide, said alkaline earth metal hydroxide being employed in an amount of 0.5 to 1.5 moles per mole of free hydroxylamine base.

2. A process according to claim 1 in which said reaction is carried out in the presence of a solvent.

3. A process according to claim 1 in which said alkaline earth metal hydroxide is calcium or barium hydroxide.

4. A process according to claim 1 in which the hydroxylamine is in the form of the hydrochloride or sulfate thereof.